United States Patent
Qi et al.

(10) Patent No.: US 12,518,199 B2
(45) Date of Patent: Jan. 6, 2026

(54) VIRTUAL TAGGING OF VEHICLES

(71) Applicant: CAMBRIDGE MOBILE TELEMATICS INC., Cambridge, MA (US)

(72) Inventors: Yuting Qi, Lexington, MA (US); Sanujit Sahoo, Somerville, MA (US); Burak Erem, Needham, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 1125 days.

(21) Appl. No.: 17/386,072

(22) Filed: Jul. 27, 2021

(65) Prior Publication Data

US 2022/0027790 A1 Jan. 27, 2022

Related U.S. Application Data

(60) Provisional application No. 63/057,081, filed on Jul. 27, 2020.

(51) Int. Cl.
*G06N 20/00* (2019.01)
*H04W 4/021* (2018.01)

(52) U.S. Cl.
CPC ............ *G06N 20/00* (2019.01); *H04W 4/021* (2013.01)

(58) Field of Classification Search
CPC ....... G06N 20/00; G06N 20/20; H04W 4/021; H04W 4/029; H04W 4/40
See application file for complete search history.

(56) References Cited

U.S. PATENT DOCUMENTS

| 2013/0165142 | A1 | 6/2013 | Huang |
| 2014/0297669 | A1 | 10/2014 | Rajakarunanayake et al. |
| 2016/0036964 | A1* | 2/2016 | Barfield, Jr. ......... H04W 4/029 |
| | | | 455/418 |
| 2018/0070291 | A1* | 3/2018 | Breaux ................ H04W 4/027 |

(Continued)

FOREIGN PATENT DOCUMENTS

| EP | 3744601 B1 | 4/2024 |
| EP | 3507787 B1 | 8/2024 |

(Continued)

OTHER PUBLICATIONS

PCT/US2021/070980, "International Search Report and Written Opinion", Oct. 21, 2021, 10 pages.

(Continued)

*Primary Examiner* — Aniss Chad
*Assistant Examiner* — Christine Nguyen Huynh
(74) *Attorney, Agent, or Firm* — Kilpatrick Townsend & Stockton LLP

(57) ABSTRACT

Techniques are disclosed for virtual tagging of vehicles that include generating an association between a user of a mobile device and the mobile device. The techniques include receiving a first set of measurements from one or more sensors of the mobile device while the mobile device is positioned in a first vehicle during a trip and training a machine-learning model using the first set of measurements. The techniques further include receiving a second set of measurements from the one or more sensors of the mobile device and determining, by executing the machine-learning model using the third set of measurements, that the mobile device is positioned in the first vehicle or a second vehicle.

17 Claims, 9 Drawing Sheets

(56) References Cited

U.S. PATENT DOCUMENTS

2018/0077538 A1* 3/2018 Matus ................ H04W 4/40
2020/0013022 A1    1/2020 Lewis et al.
2021/0370952 A1* 12/2021 Xu .................... B60W 40/08

FOREIGN PATENT DOCUMENTS

EP          4005252 B1    1/2025
EP          3588373 B1    6/2025

OTHER PUBLICATIONS

Stenneth, et al., "Transportation Mode Detection Using Mobile Phones and GIS Information", Proceedings of the 19th ACM SIGSPATIAL International Conference on Advances in Geographic Information Systems, Nov. 1, 2011, pp. 54-63.
Wahlström, et al., "Smartphone Placement Within Vehicles", IEEE Transactions on Intelligent Transportation Systems, vol. 21, No. 2, Feb. 18, 2019, 11 pages.
PCT/US2021/070980, "International Preliminary Report on Patentability", Feb. 9, 2023, 9 pages.
EP21848635.5, "Extended European Search Report", Jul. 23, 2024, 9 pages.

* cited by examiner

VIRTUAL TAGGING OF VEHICLES

CROSS-REFERENCE TO RELATED APPLICATION

This application claims priority to U.S. Provisional Patent Application No. 63/057,081, filed on Jul. 27, 2020, entitled "Virtual Tagging of Vehicles," the disclosure of which is hereby incorporated by reference in its entirety for all purposes.

BACKGROUND OF THE INVENTION

Modern mobile devices include a number of sensors operable to measure characteristics of an environment of the mobile device. Despite the progress made in the area of using mobile devices to collect and process data, there is a need in the art for improved methods and systems related to collecting and processing sensor data of a mobile device.

SUMMARY OF THE INVENTION

Embodiments of the present invention generally relate to identifying use of a particular vehicle, and more particularly, to identifying a particular vehicle in use by a driver.

A method is disclosed for virtual tagging of vehicles. The method includes generating an association between a user of a mobile device and the mobile device; receiving a first set of measurements from one or more sensors of the mobile device while the mobile device is positioned in a first vehicle; training a machine-learning model using the first set of measurements; receiving a second set of measurements from the one or more sensors of the mobile device; and determining, by executing the machine-learning model using the second set of measurements, that the mobile device is positioned in the first vehicle or a second vehicle.

Another method for virtual tagging of vehicles is disclosed. The method includes generating an association between a user of a mobile device and the mobile device; receiving a first set of measurements from one or more sensors of the mobile device while the mobile device is positioned in a first vehicle; training a machine-learning model using the first set of measurements; receiving a second set of measurements from the one or more sensors of the mobile device; and determining, by executing the machine-learning model on the second set of measurements, that the mobile device is not positioned in the first vehicle.

Another aspect of the present disclosure includes a method for determining a vehicle in which a mobile device is positioned. The method includes receiving a first set of measurements from one or more sensors of a mobile device while the mobile device is positioned in a first vehicle; and determining, by executing a machine-learning model on the first set of measurements, that the mobile device is positioned in the first vehicle; wherein the machine-learning model was trained using a previous set of measurements collected while the mobile device was positioned in the first vehicle.

Another aspect of the present disclosure includes a system comprising one or more processors and a non-transitory computer-readable medium storing instructions which, when executed by the one or more processors, configure the system to: generate an association between a user of a mobile device and the mobile device; receive a first set of measurements from one or more sensors of the mobile device while the mobile device is positioned in a first vehicle; train a machine-learning model using the first set of measurements; receive a second set of measurements from the one or more sensors of the mobile device; and determine, by executing the machine-learning model on the second set of measurements, that the mobile device is not positioned in the first vehicle.

Another aspect of the present disclosure includes a non-transitory computer-readable medium storing instructions, which when executed by the one or more processors, cause the one or more processors to perform operations comprising: generating an association between a user of a mobile device and the mobile device; receiving a first set of measurements from one or more sensors of the mobile device while the mobile device is positioned in a first vehicle; training a machine-learning model using the first set of measurements; receiving a second set of measurements from the one or more sensors of the mobile device; and determining, by executing the machine-learning model on the second set of measurements, that the mobile device is not positioned in the first vehicle.

In an embodiment, the second set of measurements is received from the one or more sensors of the mobile device while the mobile device is positioned in a second vehicle and the instructions cause the one or more processors to perform further operations comprising: training the machine-learning model using the second set of measurements; receiving a third set of measurements from the one or more sensors of the mobile device; and determining, by executing the machine-learning model on the third set of measurements, that the mobile device is positioned in the second vehicle. In another embodiment, the instructions cause the one or more processors to transmit an indication that the mobile device is positioned in the second vehicle to one or more remote devices. In an embodiment, the one or more sensors include an accelerometer, a global positioning system sensor, and/or a magnetometer. In an embodiment, training the machine-learning model includes generating a training dataset by converting the first set of measurements to a frequency domain; filtering one or more data values of the first set of measurements in the frequency domain; and generating the training dataset using a remainder of the first set of measurements. In another embodiment, filtering one or more data values of the first set of measurements in the frequency domain includes using a low-pass filter or a band-pass filter.

Numerous benefits are achieved by way of the present invention over conventional techniques. For example, embodiments of the present invention identify which vehicle a driver is currently operating. Some users may operate more than one vehicle. Sensor data collected by the mobile device can be used to distinguish between the one or more vehicles to determine which vehicle is being driven by a user of the mobile device. The sensor data can be correlated with characteristics of the identified vehicle to improve the accuracy of sensor data analysis, such as detecting driving events and driver behavior. In addition, embodiments of the present invention can be used to determine how frequently the driver operates each vehicle, which may be used to update a driver profile, insurance rates, or the like.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Illustrative embodiments of the present invention are described in detail below with reference to the following drawing figures.

Figure 1:
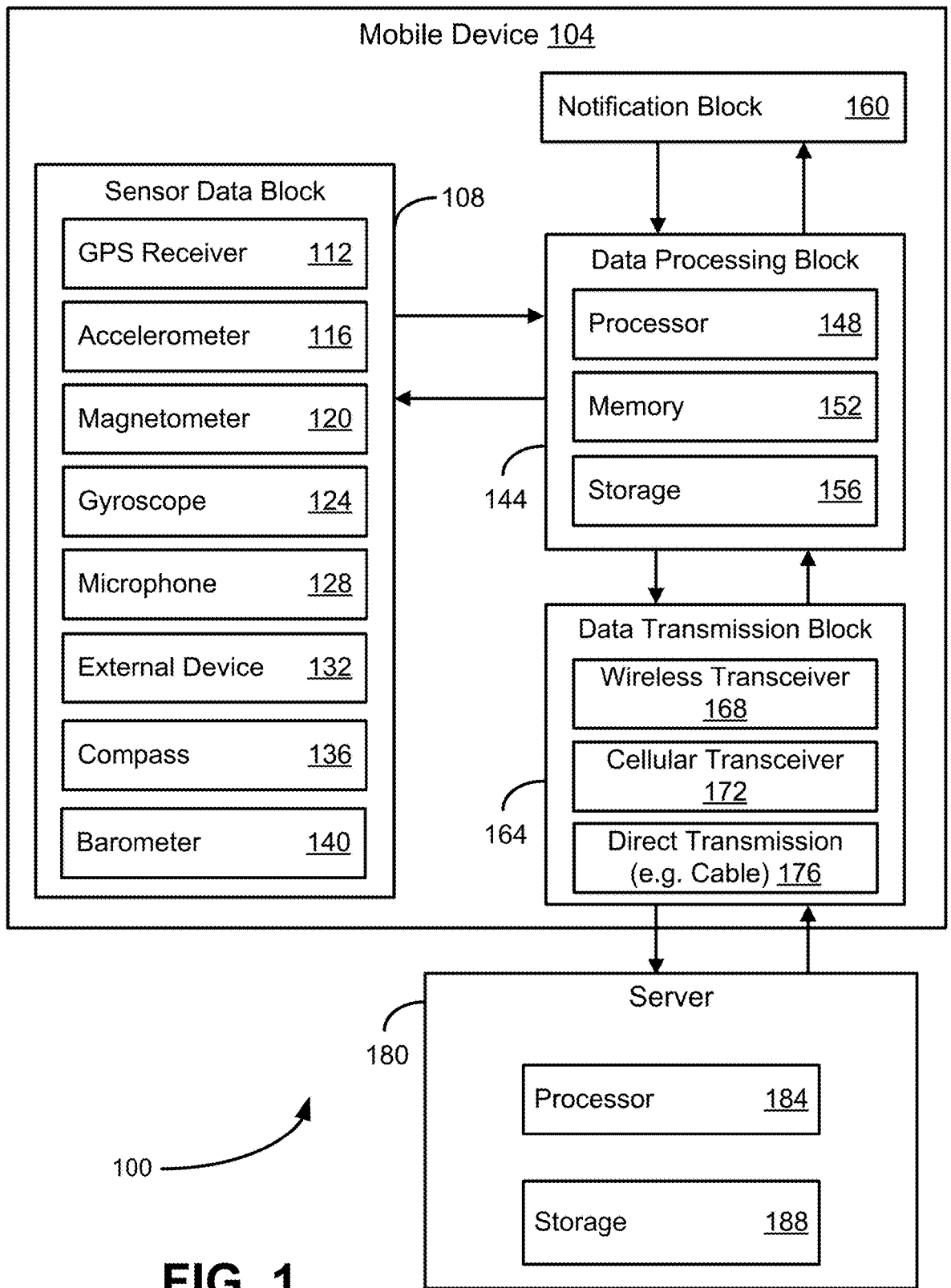
FIG. 1 is a system diagram illustrating a system for identifying a vehicle in operation according to some embodiments.

In the appended figures, similar components and/or features may have the same reference label. Where the reference label is used in the specification, the description is applicable to any one of the similar components having the same reference label.

DETAILED DESCRIPTION OF SPECIFIC EMBODIMENTS

Embodiments of the present invention generally relate to identifying use of a particular vehicle, and more particularly, to identifying a particular vehicle in use by a driver.

Many users own or operate multiple vehicles. Generally, users indicate a frequency with which a vehicle is operated on a policy associated with the vehicle (e.g., for example an insurance policy or the like). Often, frequency of use of a vehicle is updated by user input, which may not correspond to actual use. As a result, the policy may not reflect the circumstances of vehicle use that correspond to a particular user.

A mobile device associated with a user may collect a set of sensor measurements from one or more sensors of the mobile device while the mobile device is positioned within a vehicle and during a trip. The one or more sensors may include an accelerometer, a magnetometer, and/or a global positioning system sensor. Features may be extracted from the set of sensor measurements during the trip. In some instances, the features may be extracted from all of the sensor measurements of the set of sensor measurements. In other instances, the values of the sensor measurements may be used to filter measurements of the set of measurements such that features may be extracted from a portion of the set of sensor measurements.

For instance, a vehicle includes a number of components that rotate at varying speeds (based on the speed of the vehicle) while a vehicle is in motion such as the wheels, drive shaft, flywheel, transmission, etc. As a result, the magnetometer, which measures magnetic fields, may produce different measurements when the vehicle is off, idling, or driving. In some instances, the magnetometer measurements of the set of measurements may be filtered using the speed of the vehicle by discarding (or otherwise not using) those magnetometer measurements that correspond to time periods during which a speed of the vehicle is less than a threshold speed. In other instances, the magnetometer and accelerometer measurements of the set of measurements may be filtered using the speed of the vehicle by discarding (or otherwise not using) those magnetometer and accelerometer measurements that correspond to time periods during which a speed of the vehicle is less than a threshold speed. Features may then be extracted from the filtered set of sensor measurements.

The features may be passed as input into a trained machine-learning model. The machine-learning model may predict, based on the features, which vehicle corresponds to the sensor measurements, and as result, which vehicle the mobile device was positioned within during the drive. A user profile that indicates a frequency of use of the vehicles associated with the user may be updated based on the frequency of use. An accurate frequency of use of the vehicles associated with the user may thus be maintained.

FIG. 1 is an exemplary block diagram illustrating a system 100 for identifying a vehicle in operation according to some embodiments. System 100 includes a mobile device 104, which includes a plurality of processing, sensor, and communication resource components. Mobile device 104 may include a sensor data block 108, a data processing block 144, a data transmission block 164, and optionally a notification block 160. The sensor data block 108 includes data collection sensors as well as the data collected from sensors that are available to mobile device 104. The sensor data block 108 can include external devices connected via Bluetooth, universal serial bus (USB) cable, etc. The data processing block 144 may include storage 156 which may include data collected by the sensors of the sensor data block 108 processed by processor 148. This may include, but is not limited to, analyzing, characterizing, manipulating, smoothing, subsampling, filtering, reformatting, etc. Examples of mobile devices include, but are not limited to, smartphones, tablets, laptops, application specific integrated circuits (ASICs), and the like.

Data transmission block 164 may process communications (e.g., transmitted and received communications) such as the processed sensor data transmitted to an external computing device (e.g., server 180). Data transmission block 164 may include one or more communications interfaces for transmitting and/or receiving communications such as, but not limited to, wireless transceiver 168 (e.g., Bluetooth, Wi-Fi, or the like), cellular transceiver 172 and direct transmission 176 (e.g., wired connection). The external computing device may also store and/or process the data obtained from sensor data block 108. In some examples, server 180 may include its own processor 184 and storage 188.

Notification block 160 may report the results of analysis of sensor data performed by the data processing block 144 to a user of the mobile device 104 via a display (not shown). For example, notification block 160 may display or otherwise present a warning communication to a user of the mobile device 104 upon determining that that the user may be a distracted driver. In some examples, the vehicle identification determination may be a process executed by processor 148 of mobile device 104. In other examples, the vehicle identification determination may be a process executed by server 180, as described further herein with respect to FIG. 2.

In some examples, driving data may be collected using mobile device 104, which can also be referred to as an electronic device, and these examples are not limited to any particular mobile device. As an example, a variety of mobile devices including sensors such as location determination systems such as global positioning system (GPS) receivers 112, accelerometers 116, magnetometers 120, gyroscopes 124, microphones 128, external (sensor) devices 132, compasses 136, barometers 140, communications capabilities, and the like may be included or connected to mobile device 104. Examples of mobile device 104 include smart watches, fitness monitors, Bluetooth headsets, tablets, laptop computers, smart phones, music players, movement analysis devices, and the like.

One or more sensors of mobile device 104 (e.g., the sensors of sensor data block 108) may be operated to collect measurements to provide an indication as to physical interaction with the mobile device 104. In some examples, the measurements may be collected at a time when the mobile device 104 is likely to be with the driver when operating a vehicle, such as when the device is moving with a particular speed or when the device is located on a known road (e.g., a highway). The one or more sensors of mobile device 104 may also be operated to collect measurements to provide an indication of motion of the mobile device 104 as a function of motion of the vehicle in which the mobile device is disposed. The sensors used to collect data may be components of the mobile device 104, and use power resources available to mobile device 104, e.g., mobile device battery power and/or a data source external to mobile device 104.

In some examples, settings of a mobile device may be used to enable different functions described herein. For example, an operating system (OS), such as Apple iOS, Android OS, and/or a wearable device operating system having certain settings enabled can enable certain functions of embodiments. In some examples, having location services enabled allows the collection of location information from the mobile device (e.g., collected by global positioning system (GPS) receiver 112), and enabling background application refresh allows some embodiments to execute in the background, collecting and analyzing driving data even when the application is not executing. In some instances, location information may be determined by other sensors of the mobile device such as tracking movement of the mobile device (e.g., using an accelerometer controlled by an operating system of the mobile device), by receiving location information from an external source, radio triangulation (e.g., using cellular or Wi-Fi radios), by an Internet protocol (IP) address of the mobile device, or by other means. In some implementations, alerts are provided or surfaced using notification block 160 while the application is not executing (or is running in the background) since various processing and data collection processes can be performed in the background.

Figure 2:
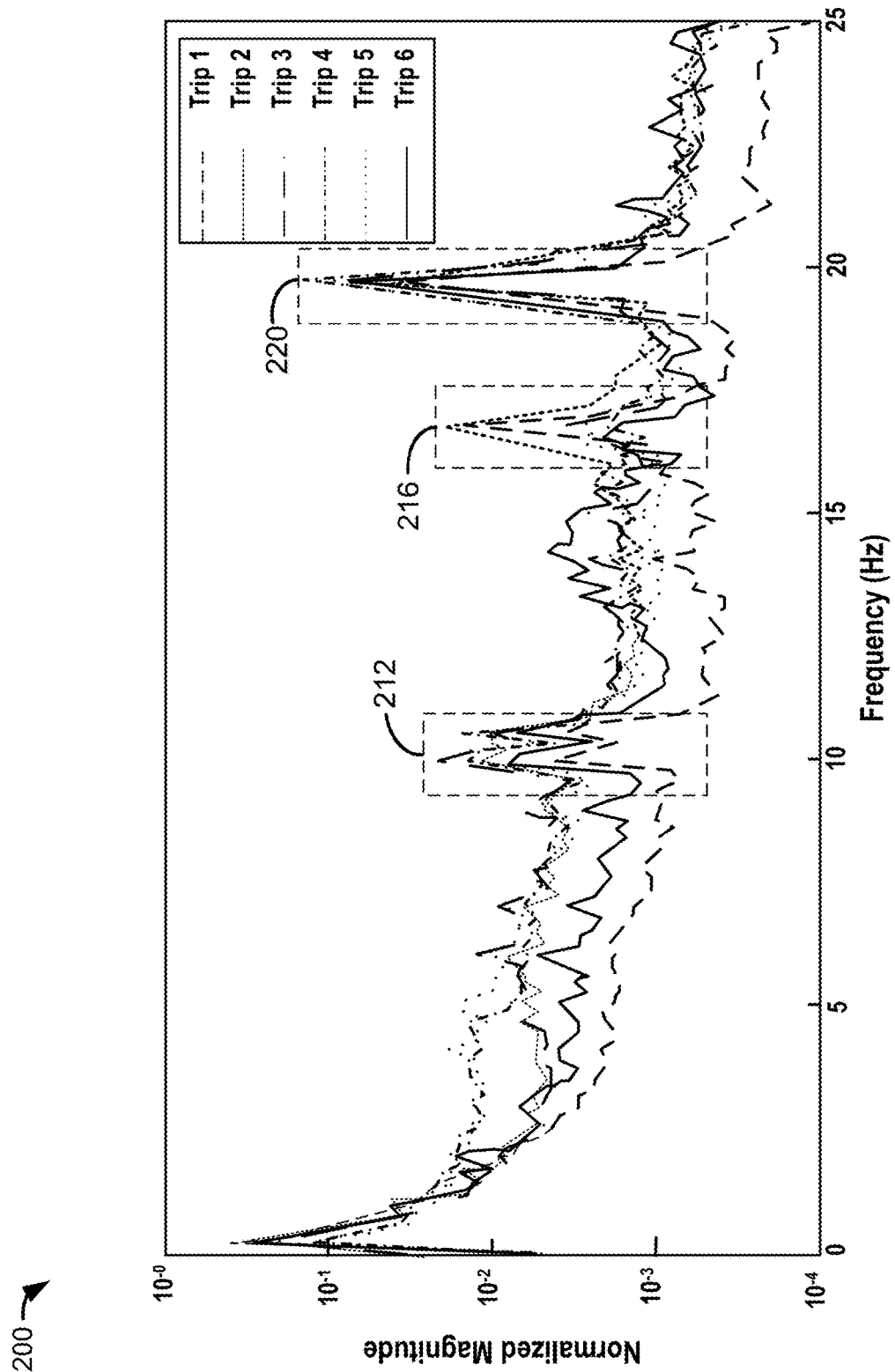
FIG. 2 illustrates a graph of magnetometer data that corresponds to a first vehicle and is usable to identify the first vehicle according to some embodiments.

FIG. 2 illustrates a graph 200 of magnetometer data that corresponds to a first vehicle and is usable to identify the first vehicle according to some embodiments. As discussed in relation to FIG. 1, a mobile device (e.g., mobile device 104 in FIG. 1) may include a magnetometer sensor (e.g., magnetometer 120) to collect magnetometer measurements during a trip. The magnetometer measurements may be aggregated into a set of magnetometer measurements. The set of magnetometer measurements may be converted to the frequency domain by, for example, a Fourier transform or the like. The set of magnetometer measurements in the frequency domain may be normalized and plotted as represented graph 200. The abscissa of graph 200 represents the frequency in hertz while the ordinate of graph 200 represents the normalized magnitude of the magnetometer data.

Graph 200 depicts six sets of magnetometer measurements in the frequency domain, with each set of magnetometer measurements corresponding to magnetometer data received during different trips that occurred in the first vehicle. As illustrated in FIG. 2, a set of magnetometer measurements were made during each of six trips (i.e., trips 1-6) and the set of magnetometer measurements have been converted to the frequency domain to provide the six sets of magnetometer measurements in the frequency domain. Although six sets of magnetometer measurements are represented by the graph, any number of sets of magnetometer measurements may be obtained and plotted or otherwise utilized as described herein. Each set of magnetometer measurements may be plotted or utilized concurrently or simultaneously (e.g., as depicted in FIG. 2). One or more features may be derived or learned from the graph to enable the determination of a particular vehicle that corresponds to a set of magnetometer measurements to be performed.

For instance, variations in magnitude (e.g., variations greater than a threshold amount) over particular frequencies or frequency ranges may be different for different vehicles. Graph 200 and the data contained therein may thus be used to identify frequencies that may be particular to the vehicle associated with graph 200. For instance, the first vehicle may exhibit first magnitude increase 212 at approximately 10-11 Hz. Similar spikes in magnitude may be observed, such as second magnitude increase 216 at approximately 17 Hz, and third magnitude increase 220 at approximately 20 Hz. Since graph 200 depicts multiple sets of magnetometer measurements over multiple trips in the same vehicle (e.g., the first vehicle), it can be determined that the relative magnitude increases at 10-11 Hz, 17 Hz, and 20 Hz are consistent across each trip, such that in a subsequent trip in the same vehicle, similar magnitude increases at those frequencies is likely to be observed.

In some instances, one or more features may be extracted from graph 200, or a suitable data set corresponding to the data illustrated in FIG. 2, to enable a classifier to predict a particular vehicle that corresponds to a set of magnetometer, accelerometer, vehicle speed measurements, or combinations thereof. For instance, the one or more features may correspond to frequencies exceeding a threshold value, where the threshold value may be determined by an average frequency of the set of magnetometer, accelerometer, and/or vehicle speed measurements, by user input, by the classifier, or the like. In some instances, the one or more features may be extracted by the classifier during training. In those instances, the set of magnetometer, accelerometer, and/or vehicle speed measurements may be passed as a training dataset input into the classifier during training. The classifier may determine the features of one set of magnetometer measurements from one vehicle that are distinguishable from another set of magnetometer, accelerometer, and/or vehicle speed measurements from another vehicle.

Figure 3:
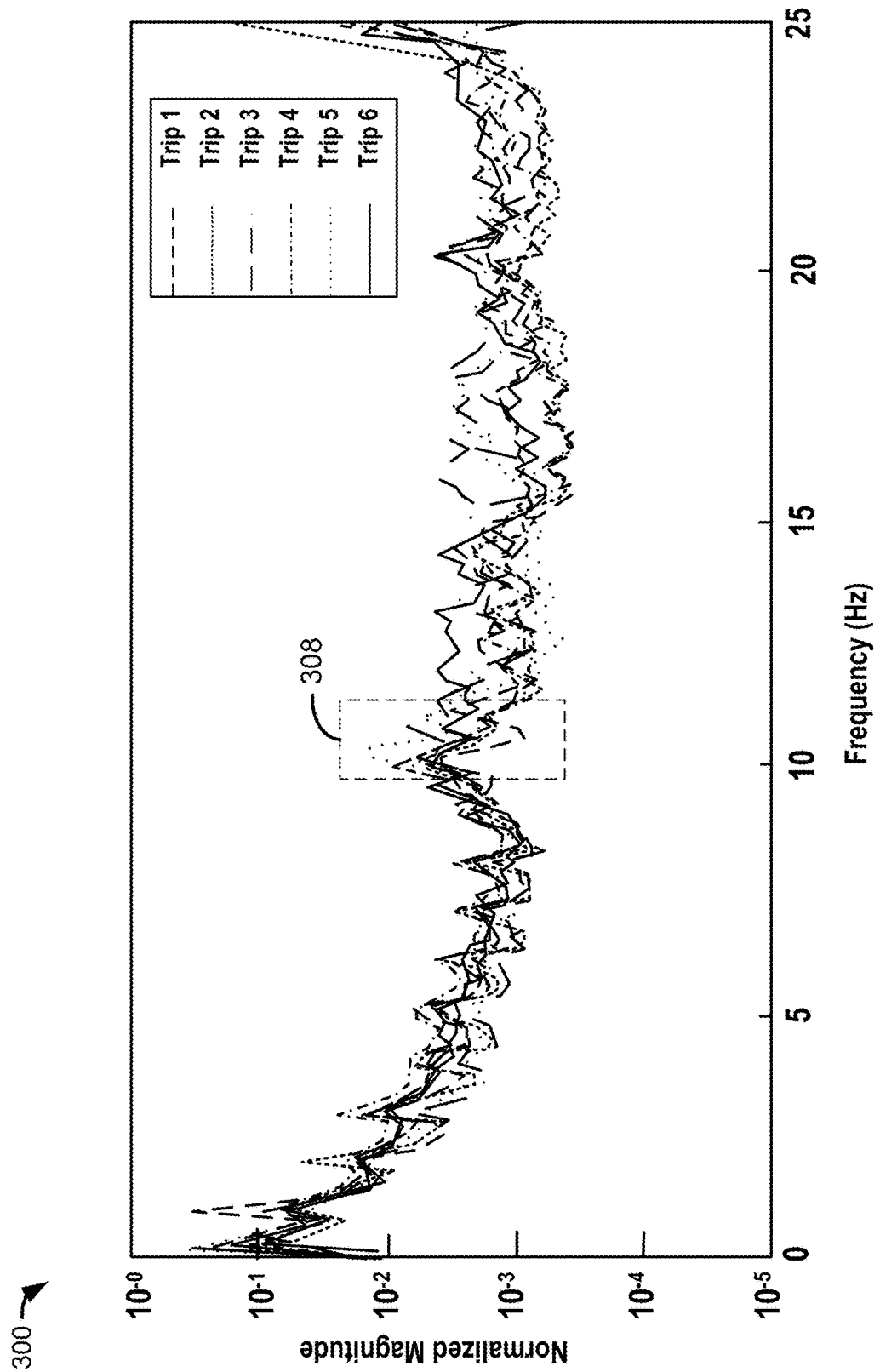
FIG. 3 illustrates another graph of magnetometer data that corresponds to a second vehicle and is usable to identify the second vehicle according to some embodiments.

FIG. 3 illustrates another graph 300 of magnetometer data that corresponds to a second vehicle and is usable to identify the second vehicle according to some embodiments. Graph 300 includes a representation of a plurality of sets of magnetometer measurements in the frequency domain. In a manner similar to that discussed in relation to FIG. 2, the plurality of sets of magnetometer measurements correspond to magnetometer measurements collected from a second vehicle that is different from the vehicle used to collect the data shown in FIG. 2. A magnitude increase 308 of the magnetometer measurements can be observed at approximately 10 Hz. Unlike the first vehicle illustrated by the data collected and displayed in FIG. 2, the magnetometer measurements represented in FIG. 3 for the second vehicle do not include a magnitude increase at approximately 17 Hz or 20 Hz. The one or more features, such as the lack of magnitude increases at certain frequencies, extracted from the plurality of magnetometer measurements represented in FIG. 3 may help distinguish a future set of magnetometer measurements as being associated with the first vehicle (e.g., from FIG. 2) or the second vehicle (e.g., represented by FIG. 3).

Figure 4:
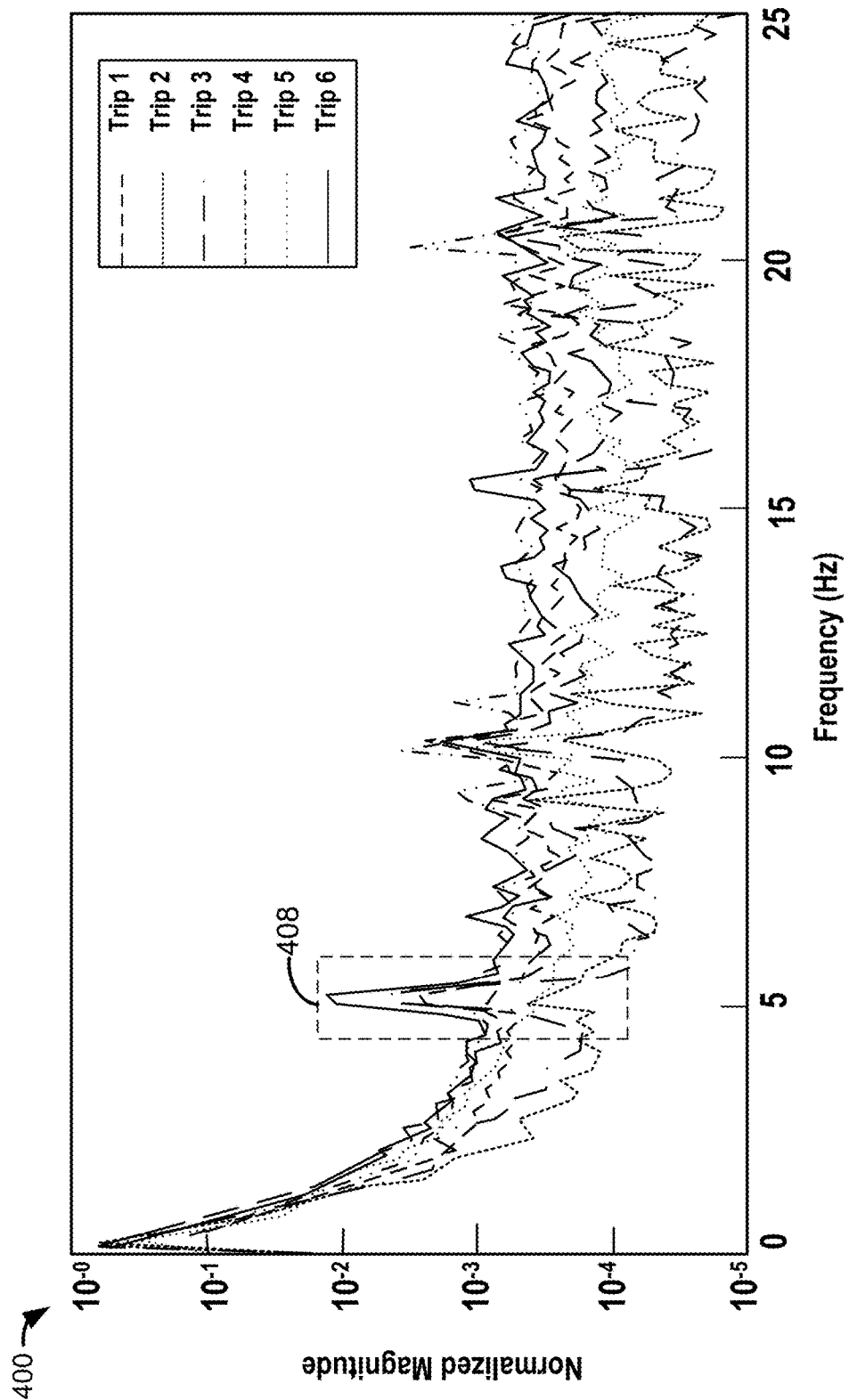
FIG. 4 illustrates another graph of magnetometer data that corresponds to a third vehicle and is usable to identify the third vehicle according to some embodiments.

FIG. 4 illustrates another graph 400 of magnetometer data that corresponds to a third vehicle and is usable to identify the third vehicle according to some embodiments. Graph 400 includes a representation of a plurality of sets of magnetometer measurements in the frequency domain obtained during multiple trips made in the third vehicle. In a manner similar to that discussed in relation to FIGS. 2 and 3, the plurality of sets of magnetometer measurements correspond to magnetometer measurements collected from a third vehicle that is different from the first and second vehicles used to collect the data shown in FIGS. 2 and 3. As illustrated in FIG. 4, a magnitude increase 408 may be observed at approximately 5-6 Hz. This magnitude increase at 5-6 Hz may be a feature that may distinguish the third vehicle from the first vehicle and the second vehicle. For example, by identifying this magnitude increase in a future set of magnetometer measurements taken during a trip, it may be determined that the trip occurred in the third vehicle as opposed to either the first vehicle or the second vehicle.

Figure 5:
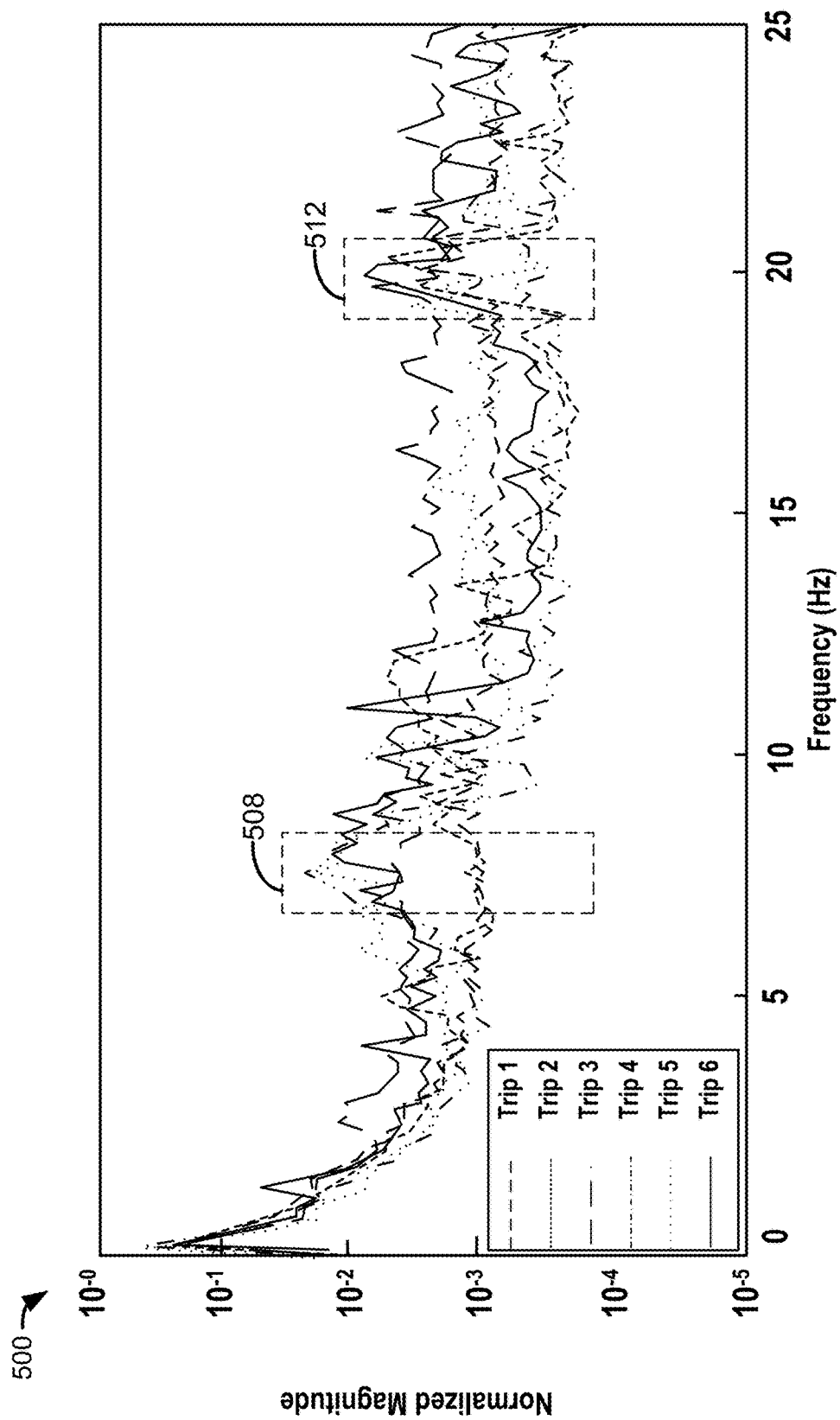
FIG. 5 illustrates another graph of magnetometer data that corresponds to a fourth vehicle and is usable to identify the fourth vehicle according to some embodiments.

FIG. 5 illustrates another graph 500 of magnetometer data that corresponds to a fourth vehicle and is usable to identify the fourth vehicle according to some embodiments. Graph 500 includes a representation of a plurality of sets of magnetometer measurements in the frequency domain obtained during multiple trips made in the fourth vehicle. In a manner similar to that discussed in relation to FIGS. 2-4, the plurality of sets of magnetometer measurements correspond to magnetometer measurements collected from a fourth vehicle that is different from the first, second, and third vehicles used to collect the data shown in FIGS. 2-4. As illustrated in FIG. 5, a first magnitude increase 508 may be observed at approximately 6-8 Hz and a second magnitude increase 512 may be observed at approximately 20 Hz. The combined magnitude increases are different from the magnitude increases (i.e., spikes) measured during trips made in the first, second, and third vehicles. Features may be extracted from graph 500, such as the magnitude increases at 6-8 Hz and at 20 Hz that distinguish the fourth vehicle from the first, second, and third vehicles. For example, by identifying this combination of magnitude increases in a future set of magnetometer measurements taken during a trip, it may be determined that the trip occurred in the fourth vehicle as opposed to either the first, second, or third vehicle.

Figure 6:
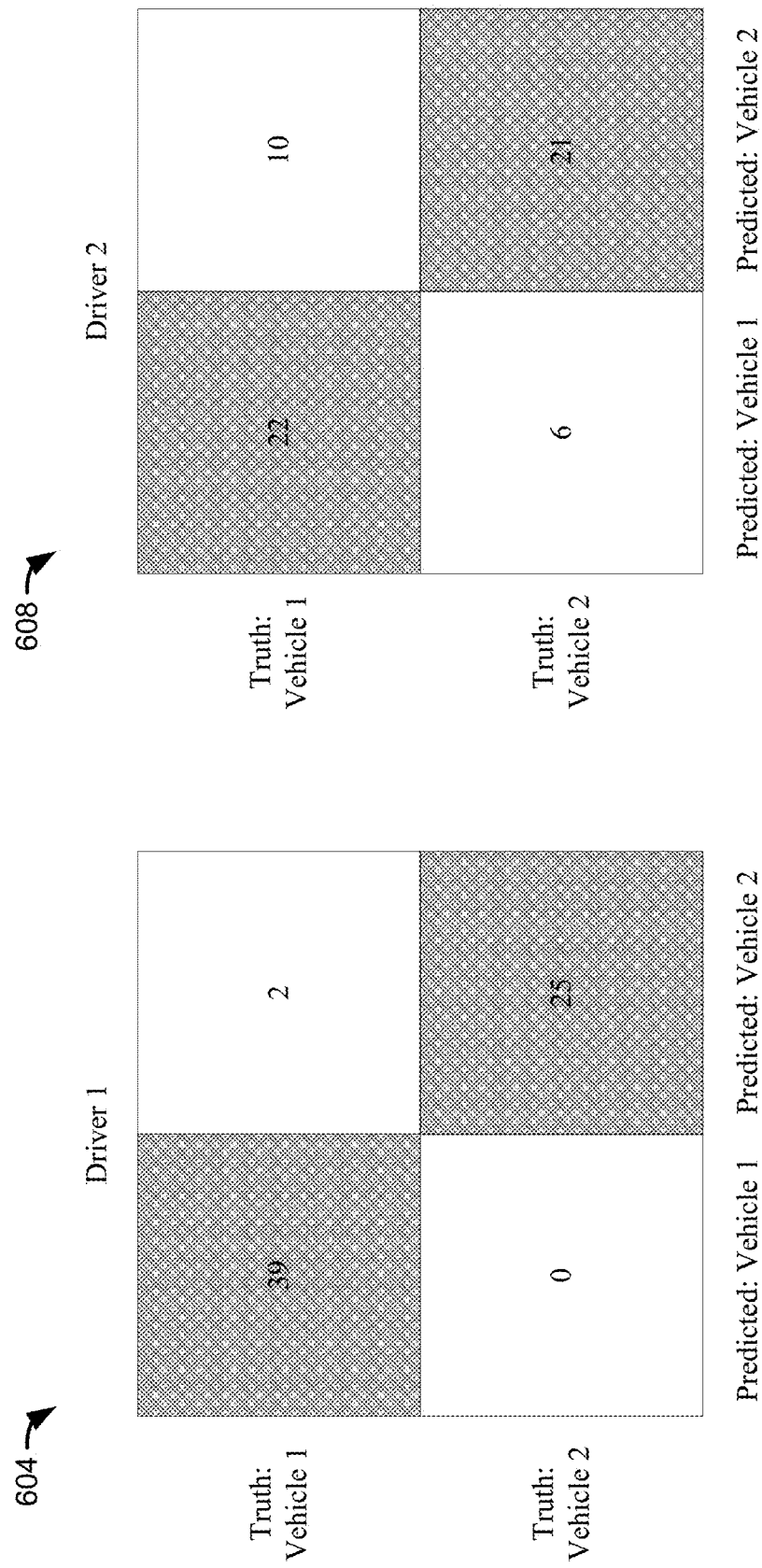
FIGS. 6A and 6B illustrate block diagrams representing the accuracy of a classifier in predicting a vehicle based on magnetometer data according to some embodiments.

FIGS. 6A and 6B illustrate block diagrams representing the accuracy of a classifier in predicting a vehicle based on magnetometer data according to some embodiments. A classifier may be a machine-learning model. The machine-learning model may be a binary, predictive classifier configured to predict whether sensor data was collected from a first vehicle or a second vehicle. The machine-learning model may be trained using supervised learning, unsupervised learning, or semi-supervised learning. For supervised learning, each set of sensor measurements may be labeled by the user. For example, the user may be prompted to enter user input during or after the drive that indicates which vehicle the user was driving. For unsupervised learning, the machine-learning model may be configured to define relationships between input features to generate a prediction. The machine-learning model may be any type of machine-learning model and may use any type of algorithm. For instance, the machine-learning model may use a clustering algorithm (e.g., such as k-means or the like) to identify related features.

A classifier (e.g., a predictive machine-learning model) may be used to predict a vehicle identity using a set of magnetometer measurements collected from a magnetometer sensor positioned in the vehicle during a trip. A classifier may be trained using previous sets of magnetometer measurements to predict a vehicle identity based on corresponding magnetometer measurements between the training data and the new set of magnetometer measurements. The block diagrams illustrated in FIGS. 6A and 6B indicate an accuracy of the classifier to predict the correct vehicle.

For instance, a mobile device associated with driver 1 may obtain a set of magnetometer measurements for each trip of a plurality of trips. A first vehicle may have been used for a portion of the trips and a second vehicle may have been used for another portion of the trips. The classifier may use features extracted from the sets of magnetometer measurements that distinguish the vehicles as described in connection with FIG. 2-5. For each set of magnetometer measurements, the classifier generates a prediction that the set of magnetometer measurements was collected from the first vehicle or the second vehicle. The block diagrams illustrated in FIGS. 6A and 6B indicate the number of trips that were correctly predicted as being made using a particular vehicle (e.g., represented as the shaded boxes) and the number of trips that were incorrectly predicted as being made using another particular vehicle (e.g., the unshaded boxes). As illustrated in FIGS. 6A and 6B, the rows of the block diagrams indicate which vehicle was actually being driven during a trip, while the columns indicate which vehicle the classifier predicted as being driven during a trip.

As illustrated in FIG. 6A, block diagram 604 indicates that there were a total of 66 trips taken by driver 1, 41 using vehicle 1, and 25 using vehicle 2. Further, the classifier correctly predicted that vehicle 1 was used during a trip 39 times (e.g., correctly predicting 39 trips used vehicle 1 as shown by the upper left shaded box). The classifier correctly predicted that vehicle 2 was used during a trip 25 times (e.g., correctly predicting 25 trips used vehicle 2 as shown by the lower shaded box). The classifier incorrectly predicted that vehicle 2 was used during 2 trips when in fact vehicle 1 was used in the trip. Finally, the classifier did not make any incorrect predictions that vehicle 1 was used during a trip when in fact vehicle 2 was used in the trip. Thus, for driver 1, the classifier has an accuracy of 96.97% because it predicted the correct trip 64 times out of the total number of 66 trips.

As illustrated in FIG. 6B, block diagram 608 indicates that there were a total of 59 trips taken by driver 2, 32 using vehicle 1, and 27 using vehicle 2. Further, the classifier correctly predicted that vehicle 1 was used during a trip 22 times (e.g., correctly predicting 22 trips used vehicle 1 as shown by the upper shaded box). The classifier correctly predicted that vehicle 2 was used during a trip 21 times (e.g., correctly predicting 21 trips used vehicle 2 as shown by the lower shaded box). The classifier incorrectly predicted that vehicle 2 was used during 10 trips when in fact vehicle 1 was used, and incorrectly predicted that vehicle 1 was used during 6 trips when in fact vehicle 2 was used. Thus, for driver 2, the classifier has an accuracy of 72.88% because it predicted the correct trip 43 times out of the total number of 59 trips.

In some instances, if the accuracy of the classifier is not greater than or equal to a threshold percentage (e.g., 95.5%), the classifier may be retrained (e.g., using a plurality of sets of magnetometer measurements that can be different from and/or include the original sets of magnetometer measurements initially used to train the classifier).

Figure 7:
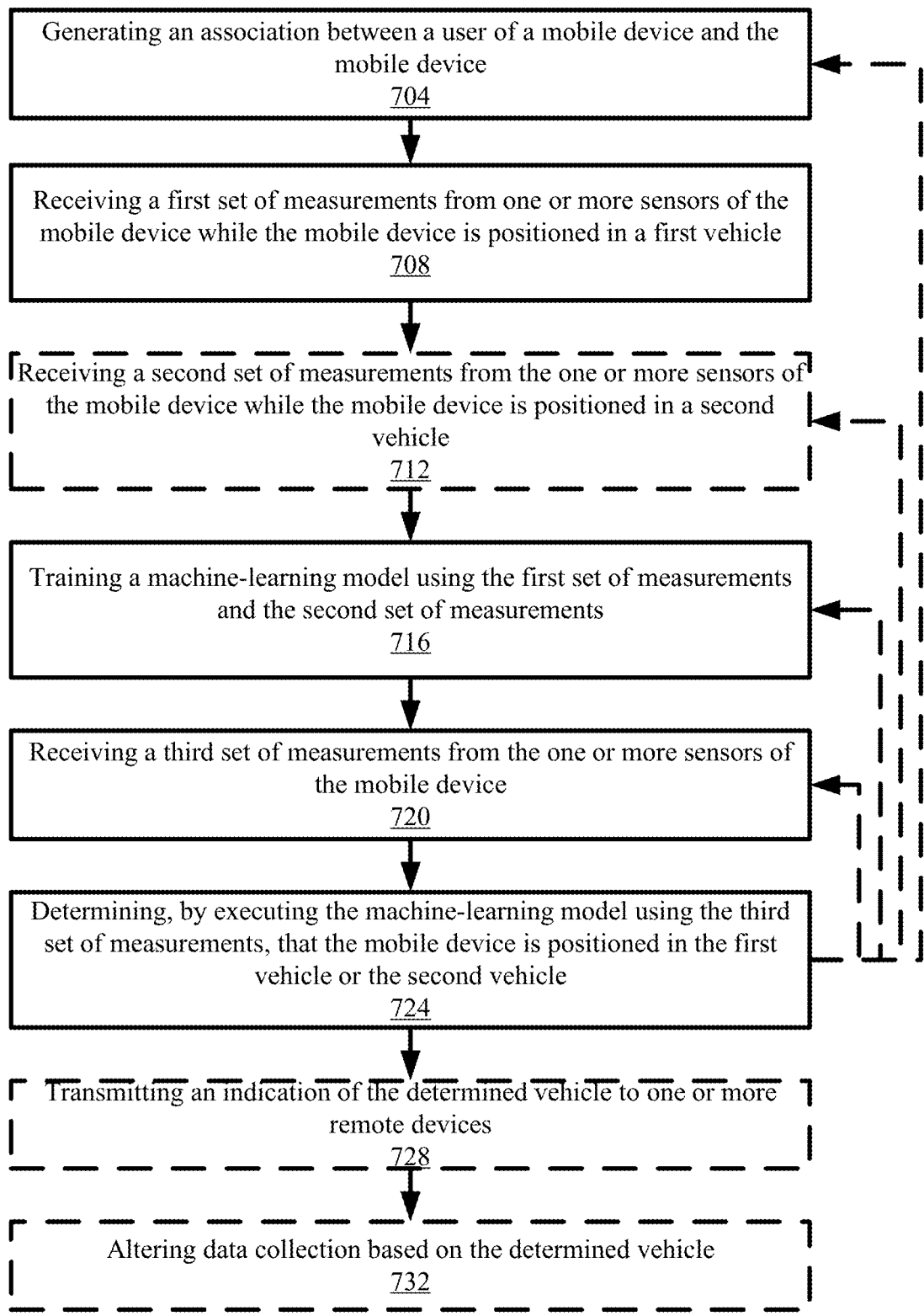
FIG. 7 is an exemplary process for identifying vehicles based on sensor data according to some embodiments.

FIG. 7 is an exemplary process for identifying vehicles based on sensor data according to some embodiments. At block 704, an association is generated between a user of a mobile device and the mobile device. The association enables a driver of a vehicle detected by the mobile device to be attributed to the user. In some instances, the user may be assumed to be the driver of a vehicle during the trip. In other instances, one or more sensors of the mobile device may be used to determine if the user is the driver or a passenger. In still yet other instances, the user may be prompted for user input indicating whether the user is the driver or the passenger.

At block 708, a first set of measurements from one or more sensors of the mobile device may be received while the mobile device is positioned in a first vehicle. In some instances, the first set of measurements may be received during one or more trips in which the first vehicle is being operated. For example, measurements collected during a first trip may be combined with measurements collected during one or more subsequent trips to form the set first set of measurements. The one or more sensors can include, but are not limited to, a magnetometer, accelerometer, a GPS sensor, or the like. In one example, the first set of measurements may include one or more acceleration measurements, one or more magnetometer measurements, and one or more speed measurements (e.g., calculated from the acceleration measurements, from the GPS sensor, or the like).

At block 712, a second set of measurements from one or more sensors of the mobile device may optionally be received while the mobile device is positioned in a second vehicle. The one or more sensors can include, but are not limited to, a magnetometer, accelerometer, a GPS sensor, or the like. In some instances, the second set of measurements includes measurements from a same sensor as measurements included in the first set of measurements. In other instances, the second set of measurements includes measurements from at least one different sensor from measurements included in the first set of measurements. In one example, the second set of measurements may include one or more acceleration measurements, one or more magnetometer measurements, and one or more speed measurements (e.g., calculated from the acceleration measurements, from the GPS sensor, or the like).

The first set of measurements may be used to train a machine-learning model to determine when the mobile device is positioned within the first vehicle or a different vehicle. For example, when sensor measurements match a pattern of sensor measurements that corresponds to the first vehicle, then it can be predicted that the mobile device is within the first vehicle. When sensor measurements do not match the pattern of sensor measurements that corresponds to the first vehicle, then it can be predicted that the mobile device is within a different vehicle (some vehicle other than the first vehicle). The second set of measurements may be used by the machine-learning model to identify a pattern of sensor measurements that corresponds to each of the one or more other vehicles such that the machine-learning model can predict that the mobile device is positioned within the first vehicle, the second vehicle, or a different (e.g., unknown) vehicle (e.g., when the sensor measurements do not match the pattern of sensor measurements that corresponds to the first vehicle or the second vehicle).

In some instances, the second set of measurements may be received while the mobile device is positioned in one or more other vehicles. In some instances, the second set of measurements may be received during one or more trips in which the one or more other vehicles were being operated. For example, the second set of measurements may include measurements collected during multiple trips in the second car in addition to measurements collected during multiple trips in a third car. In some embodiments, the second set of measurements may be used as a training dataset to train a machine-learning model to determine when the mobile device is positioned within any of the one or more other vehicles. For example, a machine-learning model may analyze the collected measurements in the second set of measurements and determine that the second set of measurements includes trips taken in multiple vehicles. This determination may be based on identifying one or more sets of repeating features that appear in some, but not all, of the collected measurements in the second set of measurements.

At block 716, a machine-learning model is trained using the first set of measurements and the second set of measurements, if they were received. The machine-learning model may be a binary, predictive classifier configured to predict whether sensor data was collected from the first vehicle or a second vehicle (and optionally other vehicles if a set of sensor measurements associated with each additional vehicle is received). The machine-learning model may be trained using supervised learning, unsupervised learning, or semi-supervised learning. For supervised learning, each set of sensor measurements may be labeled by the user. For example, the user may be prompted to enter user input during or after the drive that indicates which vehicle the user was driving.

For unsupervised learning, the machine-learning model may be configured to define relationships between input features to generate a prediction. The machine-learning model may be any type of machine-learning model and may use any type of algorithm. For instance, the machine-learning model may use a clustering algorithm (e.g., such as k-means or the like) to identify related features. In some instances, unsupervised learning may be more likely to be used than supervised learning. For instance, it may be difficult for the user to consistently remember to label trips as being associated with the first vehicle or the second vehicle. Since supervised learning cannot typically operate without these labels, any unlabeled datasets may be discarded potentially resulting in insufficient training data to train the machine-learning model to a particular accuracy threshold.

In some instances, only a portion of the first set of measurements may be used to train a machine-learning model. Some measurements of the first set of measurements may be used to filter other measurements from the first set of measurements. The machine-learning model may use the speed measurements to determine which magnetometer measurements to use as the training dataset. The magnetometer measurements that correspond to measurements made when the speed of the vehicle was greater than a threshold speed may be used as a training dataset to train the machine-learning model. Magnetometer measurements that correspond to when the speed of the vehicle was less than the threshold speed may not be used as a training dataset to train the machine-learning model (or may be discarded). The speed of the vehicle may also be used to filter the accelerometer measurements (if used for training). The accelerometer measurements may be filtered in the same manner (e.g., discarding or not using measurements that correspond to when the speed of the vehicle was less than the speed threshold in the training dataset) such that only a remainder of the accelerometer measurements that correspond to measurements made when the speed of the vehicle was greater than the speed threshold may be used as a training dataset to train the machine-learning model.

The accuracy of the machine-learning model may be monitored to trigger retraining when needed. For instance, if the accuracy of the machine-learning model falls below a threshold value, then the machine-learning model may be retrained. The machine-learning model may be retrained using existing sets of measurements or with subsequent sets of measurements.

At block 720, a third set of measurements may be received from the one or more sensors of the mobile device. The third set of measurements may be received after the first set of measurements and the second set of measurements are each received. Alternatively, the third set of measurements may only be received after the first set of measurements is received (e.g., as a second set of measurements instead of a third set of measurements). In this case, the third set of measurements may be used to further train the machine-learning model and/or determine whether the set of measurements originated from the first vehicle or not. In some instances, the third set of measurements may be received at a later time.

At block 724, it is determined whether mobile device is positioned in the first vehicle or the second vehicle by executing the trained machine-learning model on the third set of measurements. In some instances, when the second set of measurements were not received, the determination may only include an indication that the third set of measurements corresponds to the first vehicle or some other unclassified vehicle. In some instances, the third set of measurements may be processed prior to execution of the trained machine-learning model. The third set of measurements may be filtered by removing some measurements, normalized, or the like. For example, the speed measurements of the vehicle may be used to filter accelerometer measurements and/or magnetometer measurements that correspond to when the vehicle was off or idle. As a result, the machine-learning may use accelerometer measurements and/or magnetometer measurements that correspond to when the speed of the vehicle was greater than a speed threshold.

At block 728, an indication of the determined vehicle may optionally be transmitted to one or more remote devices. For instance, if the predicted vehicle is a vehicle that the user is unauthorized to drive, then a notification may be transmitted to the owner of the vehicle or the police indicating the unauthorized use. If the predicted vehicle corresponds to a vehicle the user indicated is rarely used, a notification may be transmitted to an agent (e.g., an insurance agent or the like) to indicate the use of the vehicle to trigger updated policy determinations. Transmitting the indication may use a combination of notification block 160 and data transmission block 164 as described above in reference to FIG. 1.

For instance, a user profile may indicate a frequency with which the user operates each vehicle. Initially, the user profile may be populated from user input indicating the frequency of use of each vehicle. Once the machine-learning model is trained, the frequency with which the vehicle is operated may be updated every time a particular vehicle is predicted. The user profile may be updated (e.g., continually) to maintain an accurate indication of vehicle use. The updated profile may trigger a notification alert if the use of a vehicle deviates from a predetermined threshold (e.g., as set by a policy or by user input or the like).

At block 732, data collection may optionally be altered in response to the determination of the particular vehicle that is being driven by the user. For instance, altered data collection can include, but is not limited to, increasing/decreasing a sampling rate of a sensor, collecting or calculating additional driving behavior data, suppressing notifications to the mobile device (e.g., to prevent distracting the driver), activating a sensor, deactivating a sensor, combinations thereof, and the like. For instance, the mobile device may collect different data or use different sensors based on the predicted vehicle.

For instance, a user may operate a first vehicle frequently or have a history of using the first vehicle such that a historical driving behavior of the user with respect to the first vehicle may be stored. The user may operate a second vehicle that may be a new vehicle or a vehicle less frequently operated by the user such that there may be little data associated with the driving behaviors of the user with respect to the second vehicle. When the first vehicle is predicted as being operated by the user, since the user's driving behavior may already be established, the sampling rate of various sensors may be reduced to reduce the processing load on the mobile device. When the second vehicle is predicted as being operated by the user, a sampling rate of the various sensors may be increased to obtain accurate (e.g., high resolution) driving behavior data associated with the user's operation of the second vehicle.

Once the vehicle is predicted or determined, the process may return to block 720 and wait until another set of measurements is received. Alternatively, the process may return to block 704 (e.g., if the mobile is associated with a new user), block 712 to receive additional sets of training data for retraining the machine-learning model or block 716 to retrain the model (e.g., if the accuracy of the model falls below a threshold value). Alternatively still, once block 724 completes, the process may terminate.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

It should be appreciated that the specific steps illustrated in FIG. 7 provide a particular method of identifying vehicles based on sensor data according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
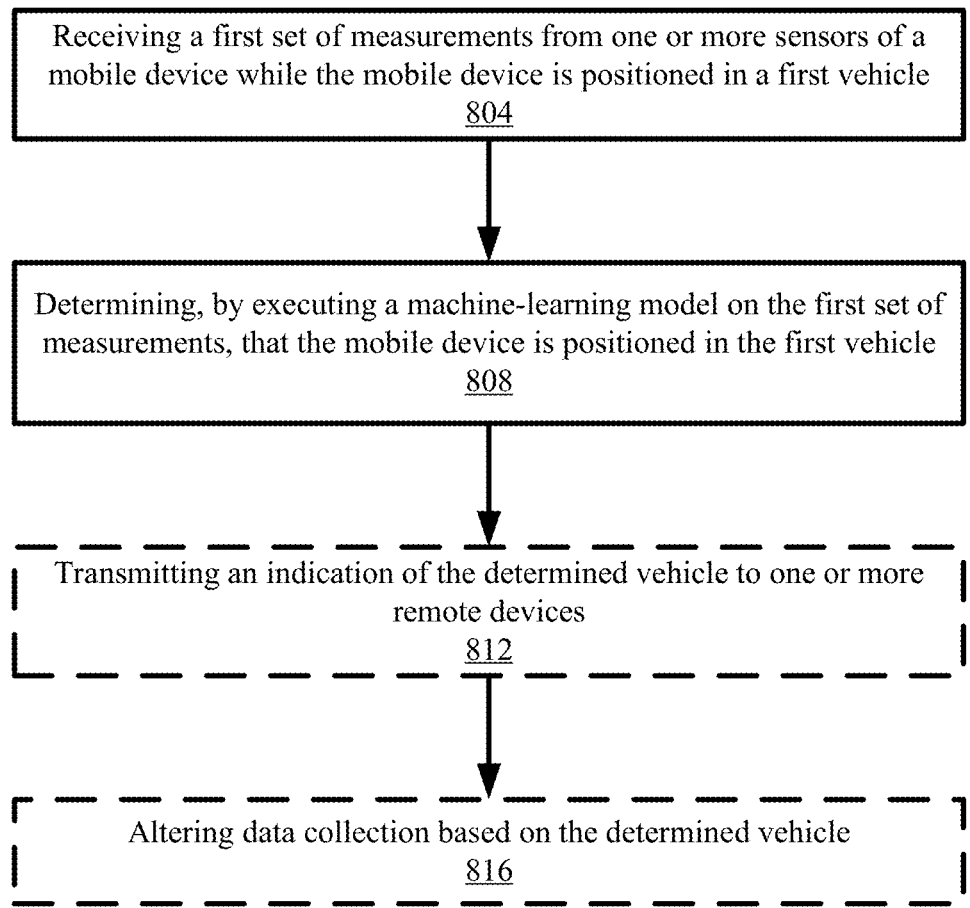
FIG. 8 is a simplified flowchart illustrating a method of determining in which vehicle a mobile device is positioned according to an embodiment of the present invention.

FIG. 8 is a simplified flowchart illustrating a method of determining in which vehicle a mobile device is positioned according to an embodiment of the present invention. At block 804, a first set of measurements from one or more sensors of a mobile device may be received while the mobile device is positioned in a first vehicle. In some instances, the first set of measurements may be received during a trip in which the first vehicle is being operated. The one or more sensors can include, but are not limited to, a magnetometer, accelerometer, a GPS sensor, or the like. In one example, the first set of measurements may include one or more acceleration measurements, one or more magnetometer measurements, and one or more speed measurements (e.g., calculated from the acceleration measurements, from the GPS sensor, or the like).

At block 808, it is determined whether the mobile device is positioned in the first vehicle by executing a trained machine-learning model on the first set of measurements. For example, when the first set of measurements matches a pattern of measurements that corresponds to the first vehicle, then it can be predicted that the mobile device is within the first vehicle. When the first set of measurements does not match the pattern of measurements that corresponds to the first vehicle, then it can be predicted that the mobile device is within a different vehicle (some vehicle other than the first vehicle). In some instances, the determination may only include an indication that the first set of measurements corresponds to the first vehicle or some other unclassified vehicle. The first set of measurements may be filtered by removing some measurements, normalized, or the like. For example, the speed measurements of the vehicle may be used to filter accelerometer measurements and/or magnetometer measurements that correspond to when the vehicle was off or idle. As a result, the machine-learning model may use accelerometer measurements and/or magnetometer measurements that correspond to when the speed of the vehicle was greater than a speed threshold.

At block 812, an indication of the determined vehicle may optionally be transmitted to one or more remote devices. For instance, if the predicted vehicle is a vehicle that the user is unauthorized to drive, then a notification may be transmitted to the owner of the vehicle or the police indicating the unauthorized use. If the predicted vehicle corresponds to a vehicle the user indicated is rarely used, a notification may be transmitted to an agent (e.g., an insurance agent or the like) to indicate the use of the vehicle to trigger updated policy determinations. Transmitting the indication may use a combination of notification block 160 and data transmission block 164 as described above in reference to FIG. 1.

For instance, a user profile may indicate a frequency with which the user operates each vehicle. Initially, the user profile may be populated from user input indicating the frequency of use of each vehicle. Once the machine-learning model is trained, the frequency with which the vehicle is operated may be updated every time a particular vehicle is predicted. The user profile may be updated (e.g., continually) to maintain an accurate indication of vehicle use. The updated profile may trigger a notification alert if the use of a vehicle deviates from a predetermined threshold (e.g., as set by a policy or by user input or the like).

At block 816, a data collection process may optionally be altered in response to the determination of the particular vehicle that is being driven by the user. For instance, altered data collection can include, but is not limited to, increasing/decreasing a sampling rate of a sensor, collecting or calculating additional driving behavior data, suppressing notifications to the mobile device (e.g., to prevent distracting the driver), activating a sensor, deactivating a sensor, combinations thereof, and the like. For instance, the mobile device may collect different data or use different sensors based on the predicted vehicle.

For instance, a user may operate a first vehicle frequently or have a history of using the first vehicle such that a historical driving behavior of the user with respect to the first vehicle may be stored. The user may operate a second vehicle that may be a new vehicle or a vehicle less frequently operated by the user such that there may be little data associated with the driving behaviors of the user with respect to the second vehicle. When the first vehicle is predicted as being operated by the user, since the user's driving behavior may already be established, the sampling rate of various sensors may be reduced to reduce the processing load on the mobile device. When the second vehicle is predicted as being operated by the user, a sampling rate of the various sensors may be increased to obtain accurate (e.g., high resolution) driving behavior data associated with the user's operation of the second vehicle.

The method 800 illustrated in FIG. 8 is performed using a machine-learning model that has been trained using a previous set of measurements collected while the mobile device was positioned in the first vehicle. The previous set of measurements may be received from one or more sensors of the mobile device while the mobile device was positioned in the first vehicle. In some instances, the first set of measurements may be received during one or more trips in which the first vehicle is being operated. For example, measurements collected during a first trip may be combined with measurements collected during one or more subsequent trips to form the set of measurements. The one or more sensors can include, but are not limited to, a magnetometer, accelerometer, a GPS sensor, or the like. In one example, the first set of measurements may include one or more acceleration measurements, one or more magnetometer measurements, and one or more speed measurements (e.g., calculated from the acceleration measurements, from the GPS sensor, or the like).

A second set of measurements from one or more sensors of the mobile device may optionally be received while the mobile device is positioned in a second vehicle. The one or more sensors can include, but are not limited to, a magnetometer, accelerometer, a GPS sensor, or the like. In some instances, the second set of measurements includes measurements from a same sensor as measurements included in the first set of measurements. In other instances, the second set of measurements includes measurements from at least one different sensor from measurements included in the first set of measurements. In one example, the second set of measurements may include one or more acceleration measurements, one or more magnetometer measurements, and one or more speed measurements (e.g., calculated from the acceleration measurements, from the GPS sensor, or the like).

The first set of measurements may be used to train a machine-learning model to determine when the mobile device is positioned within the first vehicle or a different vehicle. For example, when sensor measurements match a pattern of sensor measurements that corresponds to the first vehicle, then it can be predicted that the mobile device is within the first vehicle. When sensor measurements do not match the pattern of sensor measurements that corresponds to the first vehicle, then it can be predicted that the mobile device is within a different vehicle (some vehicle other than the first vehicle). The second set of measurements may be used by the machine-learning model to identify a pattern of sensor measurements that corresponds to each of the one or more other vehicles such that the machine-learning model can predict that the mobile device is positioned within the first vehicle, the second vehicle, or a different (e.g., unknown) vehicle (e.g., when the sensor measurements do not match the pattern of sensor measurements that corresponds to the first vehicle or the second vehicle).

The machine-learning model may be trained using the previous sets of measurements. The machine-learning model may be a binary, predictive classifier configured to predict whether sensor data was collected from the first vehicle or a second vehicle (and optionally other vehicles if a set of sensor measurements associated with each additional vehicle is received). The machine-learning model may be trained using supervised learning, unsupervised learning, or semi-supervised learning. For supervised learning, each set of sensor measurements may be labeled by the user. For example, the user may be prompted to enter user input during or after the drive that indicates which vehicle the user was driving.

For unsupervised learning, the machine-learning model may be configured to define relationships between input features to generate a prediction. The machine-learning model may be any type of machine-learning model and may use any type of algorithm. For instance, the machine-learning model may use a clustering algorithm (e.g., such as k-means or the like) to identify related features. In some instances, unsupervised learning may be more likely to be used than supervised learning. For instance, it may be difficult for the user to consistently remember to label trips as being associated with the first vehicle or the second vehicle. Since supervised learning cannot typically operate without these labels, any unlabeled datasets may be discarded potentially resulting in insufficient training data to train the machine-learning model to a particular accuracy threshold.

In some instances, only a portion of the previous set of measurements may be used to train a machine-learning model. Some measurements of the previous set of measurements may be used to filter other measurements from the previous set of measurements. The machine-learning model may use the speed measurements to determine which magnetometer measurements to use as the training dataset. The magnetometer measurements that correspond to measurements made when the speed of the vehicle was greater than a threshold speed may be used as a training dataset to train the machine-learning model. Magnetometer measurements that correspond to when the speed of the vehicle was less than the threshold speed may not be used as a training dataset to train the machine-learning model (or may be discarded). The speed of the vehicle may also be used to filter the accelerometer measurements (if used for training). The accelerometer measurements may be filtered in the same manner (e.g., discarding or not using measurements that correspond to when the speed of the vehicle was less than the speed threshold in the training dataset) such that only a remainder of the accelerometer measurements that correspond to measurements made when the speed of the vehicle was greater than the speed threshold may be used as a training dataset to train the machine-learning model.

The accuracy of the machine-learning model may be monitored to trigger retraining when needed. For instance, if the accuracy of the machine-learning model falls below a threshold value, then the machine-learning model may be retrained. The machine-learning model may be retrained using existing sets of measurements or with subsequent sets of measurements.

It should be appreciated that the specific steps illustrated in FIG. 8 provide a particular method of identifying in which vehicle a mobile device is positioned according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
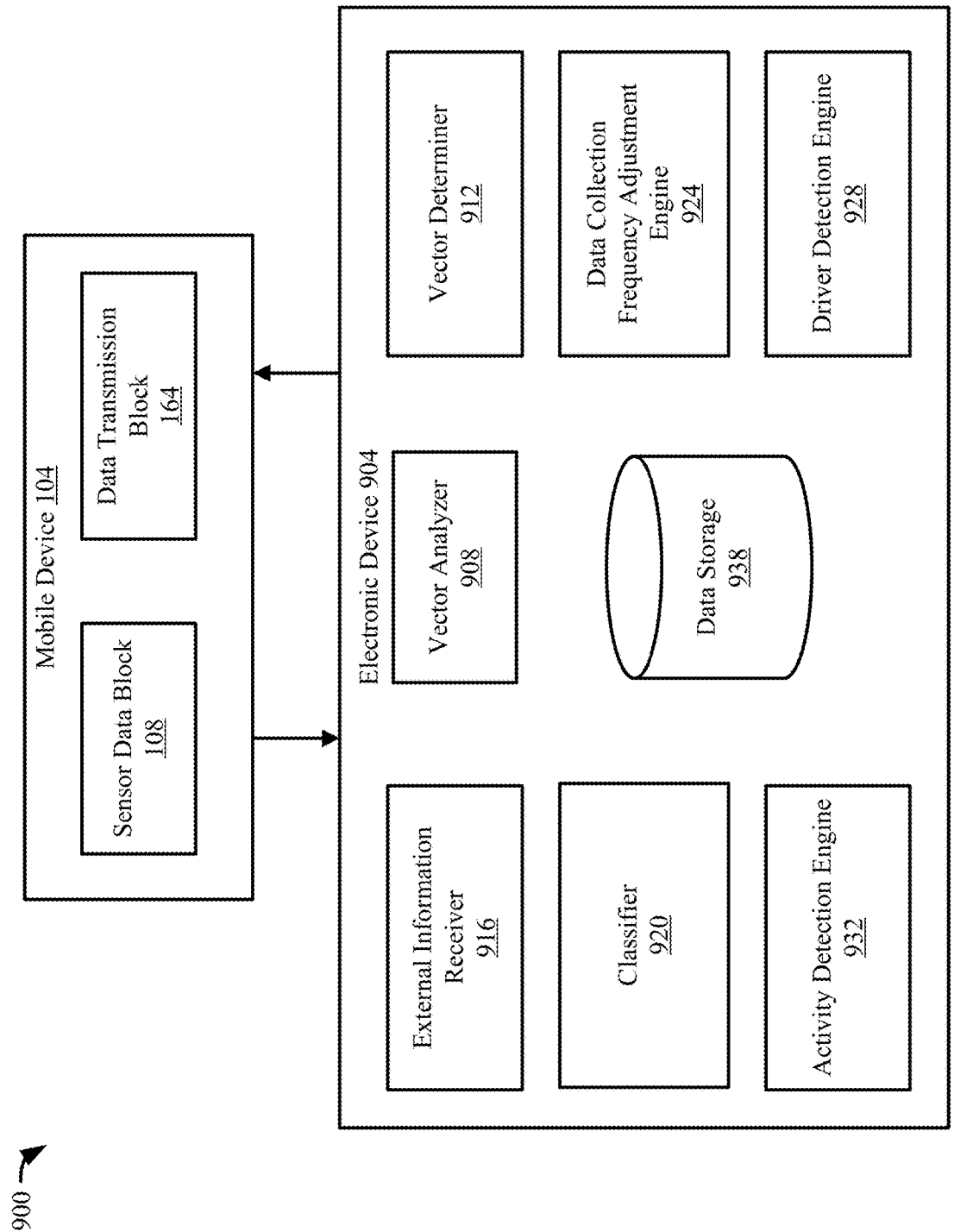
FIG. 9 depicts an exemplary block diagram of an electronic device for collecting driving data according to some embodiments.

FIG. 9 is a simplified block diagram illustrating an example of another system 900 for collecting driving data according to some aspects of the present invention. System 900 may include electronic device 904, which may be incorporated within mobile device 104 (e.g., as specialized hardware or software) or may be a separate device (or execute on a separate device) that communicates with the mobile device 104. Electronic device 904 may be the same electronic device as mobile device 104 of FIG. 1 or include some or all of the components of mobile device 104 of FIG. 1. As a separate device, electronic device 904 may be a similar type of mobile device, a different type of mobile device, a server, a computing device such as a desktop or laptop computer, a specialized processing device (e.g., such as one or more application specific circuits, field programmable gate arrays, or the like), a distributed processing system (e.g., such as a cloud environment or the like), a combination thereof (e.g., as a distributed process), or the like. In some embodiments, electronic device 904 may provide functionality using components including, but not limited to: a vector analyzer 908, a vector determiner 912, an external information receiver 916, a classifier 920 (e.g., a machine-learning model), a data collection frequency engine 924, a driver detection engine 928, and activity detection engine 932. Each component may include one or more processors (not shown) and memory (not shown). Instructions stored in the memory of a component may be executed by the one or more processors of the component providing the functionality of the component. Alternatively, one or more processors (not shown) of electronic device 904 may execute instructions stored in a central memory of electronic device 904 to provide the functionality of the components. The instructions may configure the components to function as necessary. Electronic device 904 may also include a data storage 938. In some instances, one or more of the components on electronic device 904 may be stored in memory 152 or storage 156 of mobile device 104 and/or executed by processor 148 of mobile device 104.

One or more sensors of mobile device 104 (e.g., sensors of sensor data block 108) are used to measure characteristics of an environment in which the mobile device is positioned. For instance, the one or more sensors are used to collect characteristics of a vehicle while the mobile device is positioned in the vehicle and during a drive. In that instance, the one or more sensors may be operated while the mobile device is positioned proximate to a driver during a time interval that corresponds to when the driver is operating the vehicle. As used herein, the terms a "drive" and a "trip" refer to the operation of a vehicle over an interval of time. Measurements obtained from the one or more sensors may be analyzed to determine acceleration vectors for the vehicle, as well as different features of the drive. In some instances, external data (e.g., weather, traffic, vehicle information, driver information etc.) can be retrieved and correlated with collected driving data.

In some embodiments, a display of a mobile device (such as mobile device 104) can show representations of driving data collected by the one or more sensors or be generated by any of the components of electronic device 904. For instance, representations of driving data can be generated by transforming collected sensor data (e.g., driving data collected using sensor data block 108) into different results, including, but not limited to, estimates of an activity of a user of mobile device 104 (e.g., stationary, walking, running, driving, etc.), estimates of the occurrence of different driving events during a trip for which data was collected, a metric descriptive of the driving behavior of a driver during the drive, a metric descriptive of the overall driving behavior of a driver for all drives, a metric descriptive of a driver's behavior as related to the occurrence of certain events, and/or a combination of transformed driving data and geographic data.

In some instances, collected driving data can be analyzed to assign scores to a drive, multiple drives, a driver, and/or driving behavior based on different criteria. A scoring engine (not shown) may aggregate data collected by the one or more sensors and apply one or more rules to generate scores for the embodiments. Further disclosure regarding scoring can be found in U.S. patent application Ser. No. 15/615,579, entitled "SYSTEMS AND METHODS FOR SCORING DRIVING TRIPS," filed Jun. 6, 2017, herein incorporated by reference in its entirety.

Sensor data (e.g., collected using the sensor data block 108) may be used to analyze movement of the mobile device to detect the occurrence of driving events. The sensor data may be aggregated by electronic device 904 and analyzed once a predetermined amount of the sensor data is received. For example, once electronic device 904 aggregates 50 megabytes of sensor data, electronic device 904 may initiate an analysis of the sensor data. In another example, electronic device 904 may initiate an analysis of the sensor data once electronic device 904 receives sensor data collected over a predetermined interval (e.g., a half hour of sensor data, an hour of sensor data, etc.). In still yet another example, electronic device 904 aggregates sensor data associated with a trip and analyzes the sensor data once all of the sensor data associated with the trip is received. Alternatively, mobile device 104 includes one or more of the components of electronic device 904 and provides analysis of sensor data in real time (e.g., as the one or more sensors obtain measurements).

A GPS receiver may provide time-stamped location and speed data that can be used by various applications executing on the mobile device. The time-stamped data can be used to accurately determine vehicle location and speed. A GPS receiver may detect a crash and determine distance traveled by the vehicle. For instance, a GPS receiver may detect a crash by detecting sudden changes in speed or location. However, since mobile devices operate with limited resources due to power and processing constraints and due to the high power consumption of operating a GPS receiver, electronic device 904 may use the one or more other sensors of mobile device 104 to detect vehicle location and/or speed.

For instance, a mobile device positioned in a vehicle experiences mechanical vibrations related to the activity of the vehicle. These vibrations are measurable using a subset of the sensors in the sensor data block 108 of mobile device 104 referred to as an inertial measurement unit (IMU). The measurements of the mechanical vibration can occur at varying amplitudes and frequencies, which can be used to identify the vehicle activity or in some cases activity of the user. For example, some or all of the accelerometer, gyroscope, and magnetometer measurements may distinguish walking patterns of the user from driving patterns of the vehicle (e.g., vehicle speed of approximately 5 m/s).

The IMU may include any of the accelerometer 116, the gyroscope 124, and the magnetometer 120. The IMU and the sensors included within may be a separate unit from a GPS receiver. The accelerometer 116 may be a three axis accelerometer operable to measure longitudinal and lateral acceleration as well as acceleration due to gravity. The accelerometer 116 may also be controlled by an operating system. The gyroscope 124 and the magnetometer 120 may also be three axis devices and may measure angular rotation and magnetic heading, respectively, in three dimensions. The IMU may combine the three-dimensional accelerometer data with the three-dimensional gyroscopic data to identify movement of the mobile device with six degrees of freedom (e.g., translation and rotation).

In some instances, data obtained from the IMU can be filtered and used as input to train a classifier such as classifier 920, to predict vehicle speed. An example of such a classifier includes, but is not limited to, an XGBoost classifier. The classifier may be trained using features extracted from training data of a large number of driving trips. The extracted training features may include statistical features of the driving data, for example, median, variance, and maximum values of the IMU signals (e.g., accelerometer, gyroscope, and magnetometer signals). In some instances, the orientation of the mobile device, with respect to gravity, may be determined and input to the classifier for training. Other statistical features may be used without departing from the scope of the present invention.

During a trip with a mobile device positioned in a vehicle, the IMU of the mobile device may be used to obtain movement measurements from any of the accelerometer, the gyroscope, and the magnetometer, and the movement measurements to generate an input for a classifier to predict vehicle speed. In some instances, the acceleration measurements used in the generated prediction of vehicle speed may be user acceleration measurements. User acceleration measurements may be acceleration measurements for which the gravity component of acceleration has been removed. In some instances, the acceleration measurements used in the generated prediction of vehicle speed may be raw acceleration measurements. Raw acceleration measurements may be acceleration measurements that include the gravity component.

The movement measurement signals from the IMU sensors may be sampled at a specified sampling rate to obtain digital signals. In some instances, a 9 Hz fixed sampling rate may be used for the movement measurement signals. In other instances, a 30 Hz fixed sampling rate may be used for the movement measurement signals. Other sampling rates, for example, 50 Hz or another sampling rate, may be used. Higher sampling rates can provide improved speed estimation at the cost of increased resource consumption (e.g., processing and/or power resources). Electronic device 904 and/or mobile device 104 may modulate IMU sensor sampling in real time to optimize the volume of data collected (e.g., for accuracy of data analysis) and the resource consumption.

For instance, when the sampling rate is adjustable, if the mobile device is connected to a reliable power source (e.g., such as the vehicle's power supply), the movement measurement signals may be sampled at a highest frequency (e.g., 50 Hz or a predetermined highest frequency). If the mobile device is not connected to a power source, the movement measurement signals may be sampled at a lower frequency (e.g., 30 Hz sampling or a predetermined medium frequency). If the power supply of the mobile device is below a threshold value (e.g., 25% of maximum), then the adjustable sampling rate of the movement measurement signals may be reduced to a lower frequency (e.g., 9 Hz or a predetermined low frequency) to conserve the remaining power of the mobile device. In some instances, the sampling rate of the movement measurement signals may be adjustable to improve the speed estimation. For instance, an accuracy metric may be used to indicate a likelihood that a given speed estimation is valid. If the accuracy metric does not exceed a threshold, the sampling rate of the movement measurement signals may be temporarily or permanently increased until the accuracy metric exceeds the threshold. The mobile device may modulate the sampling rate in real time based on the operating conditions (e.g., resource consumption) of the mobile device or the metric.

Filtered IMU signals can distinguish driving, stopping, and user walking patterns. A band-pass filter (e.g., implemented in hardware or software), for example, an infinite impulse response (IIR) filter, may be used to filter the IMU signals to isolate frequencies indicative of various vehicle activities and to remove signal magnitude values exceeding a specified threshold. Portions of the signals having magnitude values exceeding the specified threshold may be excluded from further band-pass filtering. The digital band-pass filters can be designed to isolate the amount of vibration (i.e., frequencies) occurring within specific frequency ranges of interest. For example, the amount of vibrations may be separated into frequency ranges from 0.2 Hz to 1.1 Hz, from 1.1 Hz to 2.0 Hz, etc., depending on the sampling frequency, by band-pass filtering the signals and/or applying a low-pass filter.

Changes in lower frequency bands, for example up to approximately 1 Hz, may contain information about the vehicle stopping, while changes in high frequency bands may correspond to the vehicle driving at higher speeds. The sources of the vibrations detected by the IMU sensors include complex interactions between engine vibrations resulting from speed changes, vibrations due to the vehicle interacting with the road surface at different speeds, etc. A machine-learning model (e.g., the classifier) can learn these more complex interactions, which can be a combination of high and low frequencies, which correspond to each vehicle behavior.

In some instances, IMU sensor signals having large magnitudes may be disruptive to the vehicle speed prediction. In those instances, filtering may exclude the large magnitude signals. For example, accelerometer signal magnitude values exceeding a threshold value of about 10 m/s$^2$ or another threshold value, as well as any subsequent portions of the signal, may be excluded. The portions of the IMU signals up to, but not including, the signal magnitude values exceeding the threshold value may be band-pass and/or low-pass filtered using the IIR filter.

The IIR filtering process may employ forward-backward filtering in which the portions of the IMU signals are filtered normally (i.e., forward filtering), and the forward filtered signals are "flipped" in time and filtered again with the IIR filter (i.e., backward filtering) producing a squared amplitude response. The IIR filters can better isolate the signals of interest and minimize or eliminate nonlinear phase distortion of the signals. The IIR filters are applied recursively, such that the result of the last step of the filter algorithm is applied to the next step. IIR filtering methods may be more computationally efficient than filtering methods that require computation of all intermediate numerical quantities that lead to the result (e.g., Fourier transforms). IIR filters are also advantageous because they can isolate frequency ranges of interest with greater signal amplitude attenuation outside of a range of interest. In some implementations, a finite impulse response (FIR) filter, rather than an IIR filter, may be used for band-pass filtering of the IMU signals.

The number of frequency bands used for the band-pass filtering may be determined by the desired granularity and the sampling frequency of the sensor data. For example, 14 passbands may be used in equally spaced 0.3 Hz frequency bands from 0.2 Hz to a Nyquist sampling frequency of 4.5 Hz for data obtained using a 9 Hz sampling, and 28 passbands may be used from 0.2 Hz to 15 Hz for data obtained using a 30 Hz data. More granular frequency bands may be used when the IMU signals are sampled at higher sampling frequencies. Selection of the number and width of the frequency bands may be determined based on the desired signal quality in each band and the granularity of the information. For example, too many frequency bands can result in degraded signal quality due to the narrow bandwidth, while too few frequency bands may result in loss of granularity of the captured information.

Features, for example statistical features, may be extracted from some or all of the filtered signals. The features used as inputs to classifier 920 can be summary statistics (e.g., median, variance, and maximum) over the various signals, covering different time spans. The features may be extracted from time windows of different lengths. In some implementations, each of the statistical features may be extracted from the IMU signals over a 5 second time window, a 10 second time window, and a 20 second time window. Each window may be centered at the time point under consideration. Over each of the windows, summary statistics such as the mean, median, variance, maximum, and minimum of the various band-passed versions of the IMU sensor signals (e.g., accelerometer, gyroscope, etc.) contained in these windows can be calculated.

The different length windows may provide levels of stability for the feature values, with longer window times producing more stable feature values. Other window lengths or a different number of windows may be used without departing from the scope of the invention. For example, in some implementations, a single window may be used. For a band-pass filtered accelerometer signal between 0.2 Hz to 1.1 Hz, nine features may be extracted, e.g., median, variance, and maximum, with each feature extracted over a 5 second time window, a 10 second time window, and a 20 second time window. The feature extraction produces a single list of values (e.g., a feature vector) for each time point under consideration.

The extracted features (e.g., the feature vectors) may be input to the classifier. The machine-learning model (e.g., the classifier) can then make a speed prediction based on the feature vector inputs. The generated prediction of the vehicle speed by the classifier may be quantized, for example, in increments of 5 m/s or another increment. In some implementations, the orientation of the mobile device with respect to gravity may be determined and input to the classifier.

Activity detection engine 932 detects an activity that corresponds to sensor measurements received from the one or more sensors of sensor data block 108. For instance, the activity detection engine 932 detects when mobile device 104 is stationary, mobile device 104 is with a user who is walking, with a user who is running, in a vehicle during a trip (e.g., vehicle is driving), in a vehicle that is flying, and the like. In some instances, activity detection engine 932 outputs a probability of the activity. In those instances, activity detection engine 932 may output more than one probability such as a 45% probability that the mobile device is walking and a 33% probability that mobile device is driving, and 22% probability of some other activity. The probability may be expressed as an integer or real number, a percentage, a grade (such as a low, medium, or high), or in another mechanism configured to represent the probability of a given activity.

Specific details are given in the above description to provide a thorough understanding of the embodiments and examples. However, it will be understood by one of ordinary skill in the art that the embodiments and/or examples described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments and/or examples.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), mask programmable gate array (MPGA), processors, controllers, micro-controllers, microprocessors, other electronic units designed to perform the functions described above, and/or combinations thereof.

Also, it is noted that the embodiments and/or examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, one or more of the operations may be performed out-of-order from the order depicted. A process may terminate when its operations are completed or return to a previous step or block. A process could have additional steps or blocks not included in the figure. A process may correspond to a method, a function, a procedure, a subroutine, a subprogram, etc. When a process corresponds to a function, its termination corresponds to a return of the function to a calling function or a main function.

Furthermore, the devices and/or systems described herein may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a non-transitory computer-readable medium such as a storage medium. The program code or code segments may further configure a system to perform the necessary tasks. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any non-transitory computer-readable medium tangibly embodying instructions may be used in implementing the methodologies described herein. For example, software codes may be stored in a memory. Memory may be implemented within the processor or external to the processor. As used herein the term "memory" refers to any type of volatile, non-volatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, cache memory, magnetic disk storage mediums, optical storage mediums, flash memory devices, and/or other machine readable mediums for storing information. The term "computer-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method comprising:
   generating an association between a user of a mobile device and the mobile device;
   receiving a first set of measurements from one or more sensors of the mobile device while the mobile device is positioned in a first vehicle during a first drive;
   training a machine-learning model using the first set of measurements;
   receiving a second set of measurements from the one or more sensors of the mobile device while the mobile device is positioned in a vehicle during a second drive that occurs after completion of the first drive, wherein a sampling rate used by at least one sensor of the one or more sensors to collect the second set of measurements is a first sampling rate;
   generating, by the machine-learning model based on the second set of measurements, an output indicating that the vehicle used during the second drive is a different vehicle than the first vehicle used during the first drive; and
   increasing the sampling rate of the at least one sensor to be a second sampling rate that is higher than the first sampling rate for a remainder of the second drive based on the output from the machine-learning model.

2. The method of claim 1, wherein the second set of measurements were received from the one or more sensors of the mobile device while the mobile device was positioned in a second vehicle, and the method further comprises:
   training the machine-learning model using the second set of measurements;
   receiving a third set of measurements from the one or more sensors of the mobile device; and determining, by executing the machine-learning model on the third set of measurements, that the mobile device is positioned in the second vehicle.

3. The method of claim 2, further comprising transmitting an indication that the mobile device is positioned in the second vehicle to one or more remote devices.

4. The method of claim 1, wherein the machine-learning model is trained using unsupervised learning.

5. The method of claim 1, wherein the one or more sensors include an accelerometer, a global positioning system (GPS) sensor, and/or a magnetometer.

6. The method of claim 1, wherein training the machine-learning model includes generating a training dataset by:
converting the first set of measurements to a frequency domain;
filtering one or more data values of the first set of measurements in the frequency domain; and
generating the training dataset using a remainder of the first set of measurements.

7. The method of claim 6, wherein filtering one or more data values of the first set of measurements in the frequency domain includes using a low-pass filter or a band-pass filter.

8. A system comprising:
one or more processors; and
a non-transitory computer-readable medium storing instructions which, when executed by the one or more processors, configure the system to:
generate an association between a user of a mobile device and the mobile device;
receive a first set of measurements from one or more sensors of the mobile device while the mobile device is positioned in a first vehicle during a first drive;
train a machine-learning model using the first set of measurements;
receive a second set of measurements from the one or more sensors of the mobile device while the mobile device is positioned in a vehicle during a second drive that occurs after completion of the first drive, wherein a sampling rate used by at least one sensor of the one or more sensors to collect the second set of measurements is a first sampling rate;
generate, by the machine-learning model based on the second set of measurements, an output indicating that the vehicle used during the second drive is a different vehicle than the first vehicle used during the first drive; and
increase the sampling rate of the at least one sensor to be a second sampling rate that is higher than the first sampling rate for a remainder of the second drive based on the output from the machine-learning model.

9. The system of claim 8, wherein the second set of measurements were received from the one or more sensors of the mobile device while the mobile device was positioned in a second vehicle, and the instructions further configure the system to:
train the machine-learning model using the second set of measurements;
receive a third set of measurements from the one or more sensors of the mobile device; and
determine, by executing the machine-learning model on the third set of measurements, that the mobile device is positioned in the second vehicle.

10. The system of claim 8, wherein the machine-learning model is trained using unsupervised learning.

11. The system of claim 8, wherein training the machine-learning model includes generating a training dataset by:
converting the first set of measurements to a frequency domain; and
filtering one or more data values of the first set of measurements in the frequency domain; and
generating the training dataset using a remainder of the first set of measurements.

12. The system of claim 11, wherein filtering one or more data values of the first set of measurements in the frequency domain includes using a low-pass filter or a band-pass filter.

13. A method comprising:
receiving a first set of measurements from one or more sensors of a mobile device while the mobile device is positioned in a vehicle during a first drive, wherein a sampling rate used by at least one sensor of the one or more sensors to collect the first set of measurements is a first sampling rate;
generating, by a machine-learning model based on the first set of measurements, an output indicating that the vehicle is a same vehicle as a first vehicle used during a previous drive that was completed prior to a beginning of the first drive, wherein the machine-learning model was trained using a previous set of measurements collected while the mobile device was positioned in the first vehicle during the previous drive; and
reducing the sampling rate of the at least one sensor to be a second sampling rate that is lower than the first sampling rate for a remainder of the first drive based on the output from the machine-learning model.

14. The method of claim 13, further comprising transmitting an indication that the mobile device is positioned in the first vehicle to one or more remote devices.

15. The method of claim 13, wherein the machine-learning model is trained using unsupervised learning.

16. The method of claim 13, wherein the one or more sensors include an accelerometer, a global positioning system sensor, and/or a magnetometer.

17. The method of claim 13, wherein training the machine-learning model includes generating a training dataset by:
converting the previous set of measurements to a frequency domain;
filtering one or more data values of the first set of measurements in the frequency domain; and
generating the training dataset using a remainder of the previous set of measurements.

* * * * *